United States Patent

Stahl

[15] 3,666,153

[45] May 30, 1972

[54] TAPE PLAYER WITH FAST TAPE WINDING MECHANISM

[72] Inventor: Robert Michael Stahl, Indianapolis, Ind.

[73] Assignee: RCA Corporation

[22] Filed: June 26, 1970

[21] Appl. No.: 50,273

[52] U.S. Cl. ....................226/178, 226/13

[51] Int. Cl. ....................B65h 17/22

[58] Field of Search ....................226/13, 61, 169, 178, 190

[56] References Cited

UNITED STATES PATENTS 2,026,232 12/1935 Joachim....................226/169

3,385,497 5/1968 Taraborrelli....................226/190 X

*Primary Examiner*—Richard A. Schacher
*Attorney*—Eugene M. Whitacre

[57] ABSTRACT

A tape player apparatus includes a capstan utilized to drive a magnetizable medium past a transducing head. A flywheel is rotatably mounted to the capstan which is adapted to be rotated at two different speeds. The flywheel is driven at a first rotational velocity which is coupled to the capstan by a releaseable securing means. Means are provided for driving the capstan at a different, greater, rotational velocity. The releaseable securing means releases the capstan from the flywheel for independent rotation when the capstan is driven at the second rotational velocity.

6 Claims, 6 Drawing Figures

INVENTOR
ROBERT MICHAEL STAHL

BY David E. Pitchenik
ATTORNEY

INVENTOR
ROBERT MICHAEL STAHL

BY David E. Pitchenik
ATTORNEY

TAPE PLAYER WITH FAST TAPE WINDING MECHANISM

The present invention pertains to magnetic tape players, and more particularly, to magnetic tape players which include a fast winding mechanism.

It is common practice in many magnetic tape players to drive a magnetic tape past a transducing head by a capstan and pressure roller arrangement. In such cases, the magnetic tape is pressed between the capstan and pressure roller, the capstan being rotationally driven to impart motion to the magnetic tape and move it across the tape player transducing head. It is essential for proper operation that the capstan be driven at a uniform rotational speed. To prevent irregularities in the capstan speed, the capstan is often coupled to a flywheel of substantial mass. The inertia of the flywheel tends to inhibit rotational speed variations and helps insure that the capstan is rotated at a uniform speed. This is particularly important during the record or playback operation where distortion of the recorded or reproduced signal would occur with speed variation.

When the capstan is driven at a speed which is substantially greater than the record or playback speed, effectuating a fast forward or rewind of the tape, the flywheel tends to resist the change in rotational speed. The inertial resistance to either an increase or decrease in rotational speed necessitates the utilization of an expensive powerful motor where the speed change is to be accomplished relatively quickly. Moreover, where the flywheel is rotated at a high speed, a slight misalignment of the flywheel can introduce serious vibrations which may result in considerable damage to the tape player components, especially the tape drive mechanism.

In accordance with the present invention, a flywheel is rotatably mounted to a shaft which is adapted to be rotated at two different speeds. The flywheel, which is driven at a first rotational velocity, is coupled to the shaft by a releasable securing means. Means are provided for independently and selectively driving the shaft at a different, greater, rotational velocity. The releaseable securing means releases the shaft from the flywheel for independent rotation when the shaft is driven at the second rotational velocity.

A complete understanding of the present invention may be obtained from the following detailed description of a specific embodiment thereof, when taken in conjunction with the accompanying drawings, in which.

Figures 1, 2:
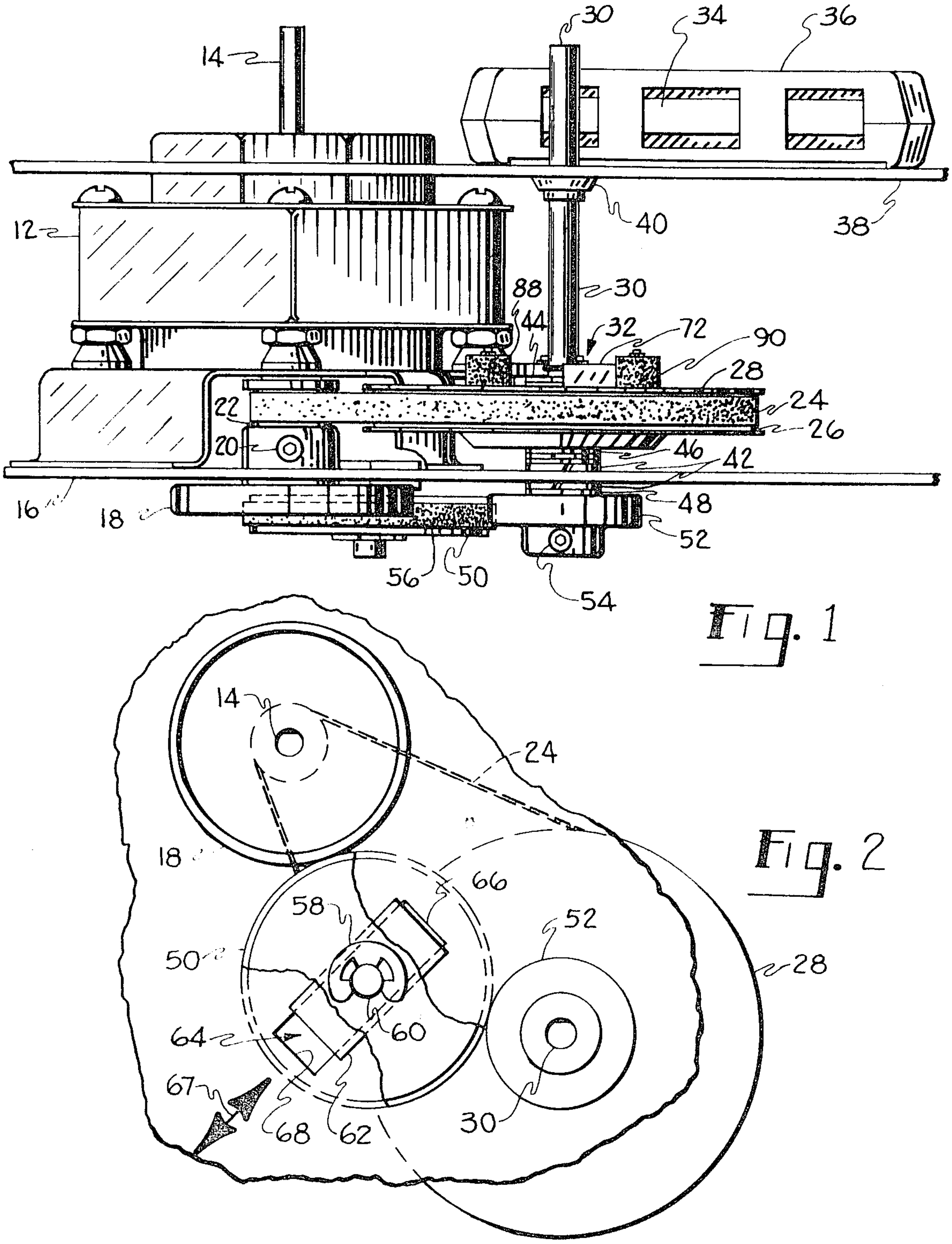
FIG. 1 is a front elevation view of a tape player mechanism embodying the present invention.
FIG. 2 is a fragmentary bottom view, partially broken away, of the tape player mechanism shown in FIG. 1.

Referring now to FIGS. 1 and 2, a tape player mechanism includes a drive motor 12 having a motor shaft 14. The motor 12 is supported on a bottom plate 16 of the tape player mechanism. A drive roller 18 is secured to the motor shaft 14 by a set screw 20. The drive roller 18 includes a slotted portion 22 which captivates a drive belt 24. The belt is further held captive in a slotted portion 26 of the tape player mechanism flywheel 28. The rotational movement of the motor shaft 14 is coupled to the tape player mechanism flywheel by the drive roller 18 and belt 24.

The flywheel 28 is secured to the tape player mechanism capstan shaft 30 by a releaseable securing mechanism 32 when the tape player mechanism is conditioned for a slow tape winding operation, playback or recording. When the tape player mechanism is so conditioned, the rotation of the flywheel 28 is coupled to the capstan 30 which drives the magnetic tape 34 of an endless loop tape cartridge 36 at a predetermined speed, for example 3.75 inches per second. Rotational speed variations of the capstan 30 are inhibited by the mass of the flywheel 28 to insure that the magnetic tape 34 is drawn across the tape player transducers, not shown, at a uniform speed. An opening in the tape player mechanism top plate 38 provides a bearing 40 for the capstan 30. A second bearing 42 for the capstan 30 is provided in the bottom plate 16 of the tape player mechanism. A series of C rings 44, 46 and 48 secure, for independent rotation, the flywheel 28 to the capstan 30 and the capstan 30 to the tape player mechanism bottom plate 16.

For fast tape winding operation, i.e. fast forward, an intermediate roller 50 is moved into engagement with the drive roller 18 and a capstan roller 52. The capstan roller is secured to the capstan shaft 30 by a set screw 54. The intermediate roller 50 includes a frictional material 56 on its outer periphery and couples the rotation of the drive roller 18 to the capstan roller 52. The diameters of the drive roller 18, the intermediate roller 50 and the capstan roller 52 are selected to provide the desired rotational speed to the capstan 30 for the fast reeling operation to propel the magnetic tape 34 at an increased speed, for example 37.50 inches per second.

The intermediate roller 50 is secured for independent rotation by a C ring 58 to a shaft 60 mounted to an I beam section 62. The I beam section 62 is captivated in a slot 64 in the bottom plate 16 of the tape player mechanism and is movable in the direction of the arrow 67. The I beam section 62 is shown moved toward the slot end 66 where the intermediate roller 50 is in engagement with the drive roller 18 and capstan roller 52. When the I beam 62 is moved to the slot end 68, the intermediate roller 50 disengages from the drive roller 18 and the capstan roller 52. The movement of the I beam section 62 may be facilitated by a lever, not shown, extending through the tape player mechanism top plate. This permits a user to engage and disengage the intermediate roller from the drive roller and capstan roller to condition the tape player mechanism for slow or fast winding operation.

Figure 3:
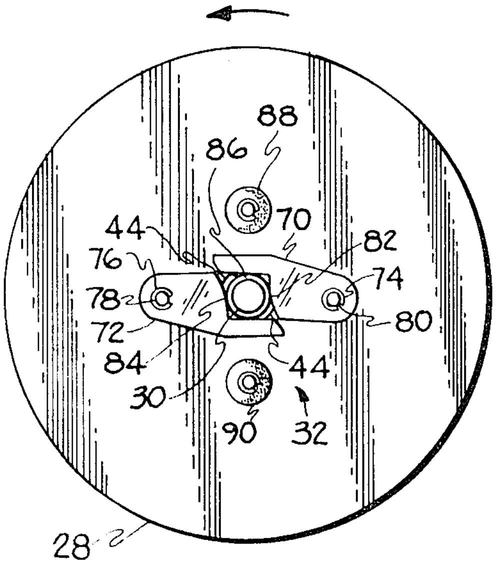
FIG. 3 is a top plan view of the tape player mechanism capstan and flywheel when conditioned for a slow tape winding operation.
Figure 4:
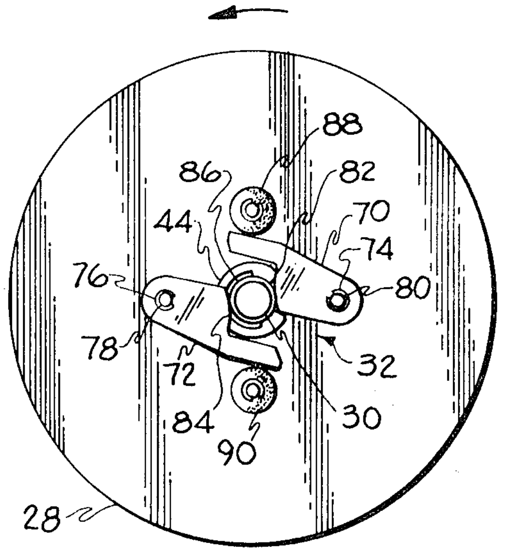
FIG. 4 is a top plan view of the tape player mechanism capstan and flywheel when conditioned for a fast tape winding operation.

Referring now to FIGS. 3 and 4, the releaseable securing mechanism 32 which couples the flywheel 28 to the capstan 30 when the tape player mechanism is conditioned for slow tape winding operation and releases the flywheel from the capstan for independent rotation when the tape player mechanism is conditioned for fast winding operation, includes two toggle fingers 70 and 72. The toggle fingers are rotationally secured by C rings 74 and 76 to studs 78 and 80 mounted to the flywheel 28. Each of the toggle fingers 70 and 72 includes an arcuate locking cam surface 82 and 84, respectively. When the tape player mechanism is conditioned for fast winding operation, the intermediate roller 50 engages the drive roller 18 and the capstan roller 52, and the capstan is propelled at a greater rotational speed than is imparted to the flywheel 28 by the belt 24. The flywheel 28 continues to be driven by the belt 24 at its set rotational speed. At this time, a rubber ring 86 which is frictionally fit in an annular groove in the capstan 30 rotates with the capstan in a counterclockwise direction and forces the toggle fingers 70 and 72 toward the periphery of the flywheel 28. The toggle fingers are restrained in their movement toward the periphery of the flywheel by two stops 88 and 90. Each of the stops includes a stud having a resilient fibrous material secured to it by a C ring to absorb the impact of the outwardly moving toggle fingers. The stops 88 and 90 are positioned on the flywheel 28 so that the toggle fingers arcuate surfaces 82 and 84 are barely in contact with the rubber ring 86.

When the tape player mechanism is conditioned for slow winding operation, the intermediate roller 50 is moved out of engagement with the drive roller 18 and the capstan roller 52 and the capstan 30 is no longer positively driven by the intermediate roller 50. Consequently, the capstan begins to slow down and very shortly reaches a point where the friction between the arcuate surfaces 82 and 84 and the rubber ring 86 is sufficient to cause the toggle fingers 70 and 72 to move inward toward the capstan 30. Initially, slippage occurs between the capstan 30 and the rubber ring 86. The toggle fingers continue their inward movement until the fingers firmly press and wedge against the rubber ring 86 and secure the capstan shaft 30 to the flywheel for unitary rotation. This action takes approximately one to two seconds and is sufficiently gradual so that the magnetic tape 34 does not rip, tangle or spew. The compliance of the rubber ring 86 provides added protection against sudden momentary tape stress. Thus, the capstan shaft 30 is driven from the motor shaft 14 through the drive roller 18 and belt 24, the flywheel 28, and the toggle fingers 70–72 cooperating with the capstan rubber ring 86.

Figure 5:
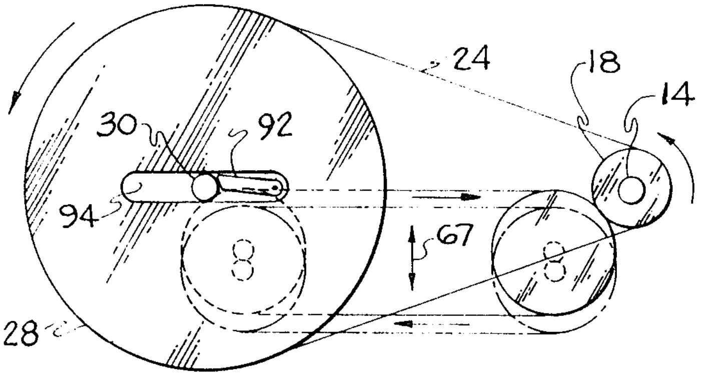
FIG. 5 is a top plan view of an alternate embodiment of the present invention utilizing a single flywheel toggle finger and a movable pulley arrangement.
Figure 6:
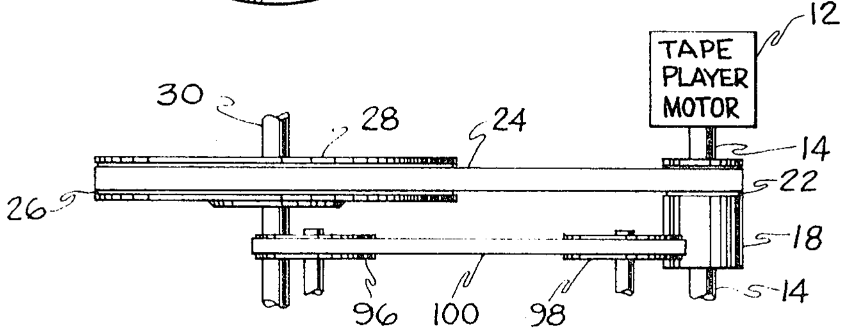
FIG. 6 is a side elevation view of the tape player mechanism shown in FIG. 5.

The tape player mechanism flywheel-capstan releaseable securing mechanism can be modified as shown in FIG. 5 to include a single toggle finger 92 which is recessed in a slot 94 in the flywheel. The operation of the toggle finger 92 is similar to the operation described above in connection with two toggle fingers 70–72 and the same reference numerals are utilized to designate similar structural elements. When the tape player is conditioned for a fast winding operation, the capstan 30 is driven by means of a roller and belt arrangement including the rollers 96 and 98 and belt 100. The roller 96 engages the capstan shaft 30, and the roller 98 engages the motor drive roller 18. Thus, the capstan 30 is driven at a greater rotational speed than the flywheel 28. At this time, the toggle finger 92 is forced toward the periphery of the flywheel 28. Its outward movement is restrained by the walls of the slot 94 with the tip of the toggle finger barely in contact with the capstan 30. When the rollers 96 and 98 are moved out of engagement with the capstan 30 and motor drive roller 18, the rotational speed of the capstan 30 decreases and eventually reaches a point where the toggle finger 92, because of the friction between it and the capstan, moves in to wedge against the capstan thereby securing the flywheel to the capstan for unitary rotation. The rotation of the capstan 30 is effectuated by the motor 12, through the motor drive shaft 14, the motor shaft drive roller 18, the belt 24, the flywheel 28 and the toggle finger 92.

What is claimed is:

1. In a tape player apparatus of the type including a capstan and a flywheel where said capstan is utilized to drive a magnetizable tape past a transducing head, and where the tape player apparatus is conditionable for slow and fast tape winding operation, the combination comprising:

first means for driving said flywheel at a predetermined rotational velocity;

releaseable securing means for securing said capstan to said flywheel for unitary rotation when said player apparatus is conditioned for slow tape winding operation, said releaseable securing means including at least one toggle finger rotatably mounted to said flywheel, said toggle finger having a locking cam surface in constant engagement with a friction surface on said capstan;

second means for driving said capstan at a rotational velocity in excess of said flywheel predetermined rotational velocity when said player apparatus is conditioned for fast tape winding operation; and said releaseable securing means responsive to the relative rotational velocity of said capstan and said flywheel such that said releaseable securing means releases said capstan from said flywheel whenever said capstan is driven at a greater rotational speed than said flywheel such that, during fast tape winding operation, said capstan and said flywheel rotate at different speeds.

2. The combination as defined in claim 1 wherein said toggle finger is mounted on one of the major surfaces of said flywheel and engages a stop when said player apparatus is conditioned for fast tape winding operation, said stop positioned such that said toggle finger locking cam surface just barely engages said capstan friction surface.

3. The combination as defined in claim 2 wherein said second means for driving said capstan includes a movable roller and belt mechanism adapted to couple said motor shaft rotation to said capstan.

4. The combination as defined in claim 1 wherein said releaseable securing means includes a second toggle finger rotatably mounted to said flywheel, said second toggle finger having a locking cam surface in constant engagement with said friction surface.

5. The combination as defined in claim 4 wherein said first means for driving said flywheel includes a motor shaft and a belt coupled between said flywheel and motor shaft.

6. The combination as defined in claim 5 wherein said second means for driving said capstan includes a movable intermediate idler roller adapted to couple said motor shaft rotation to said capstan.

* * * * *